Patented July 15, 1924.

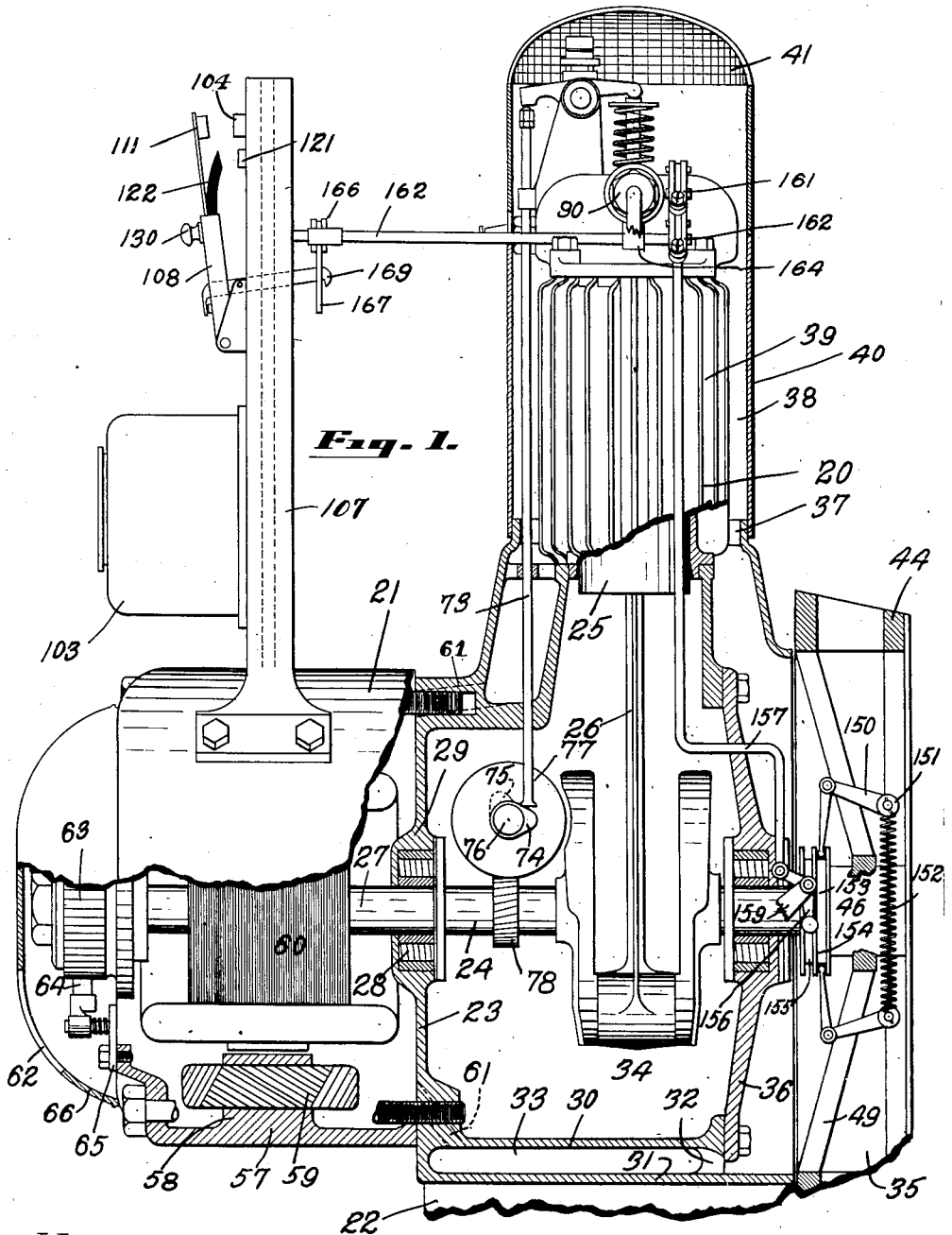

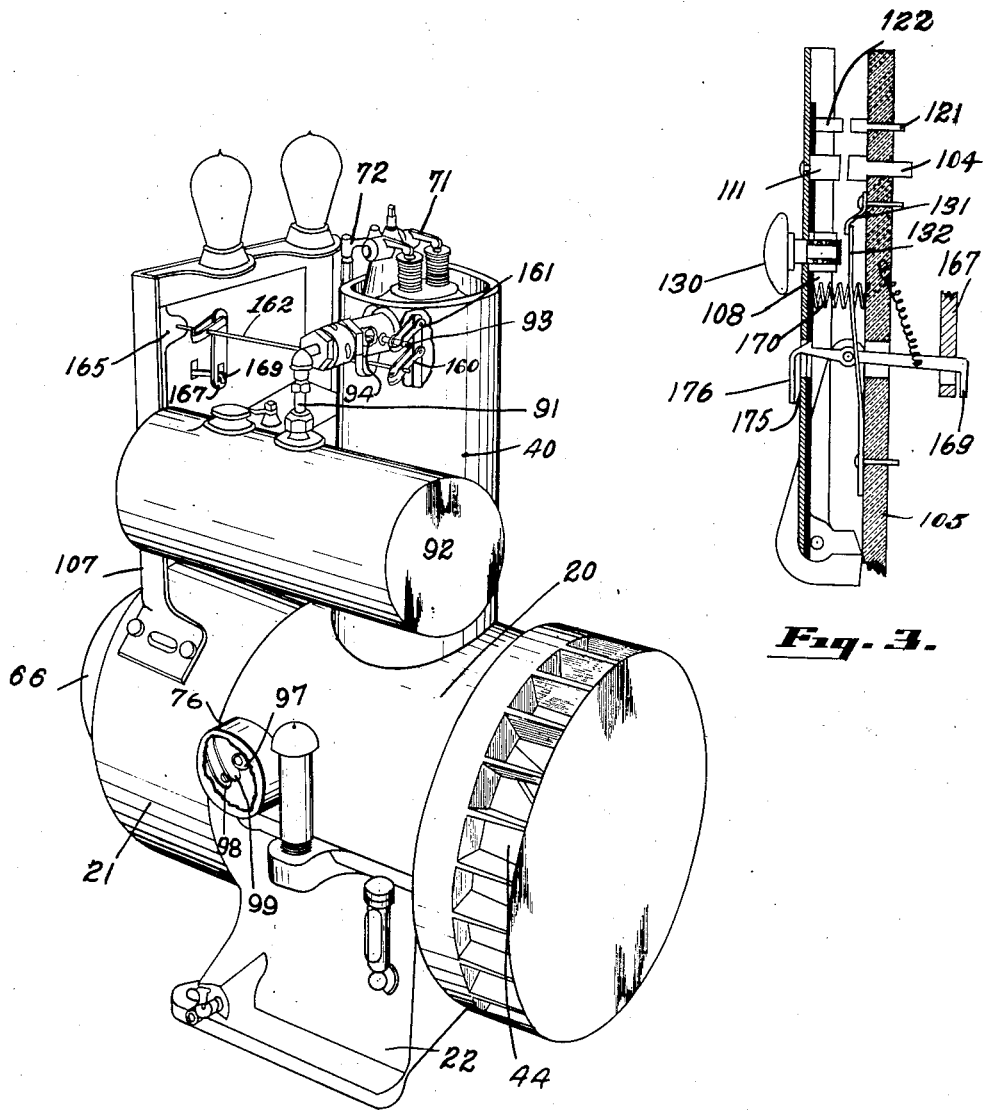

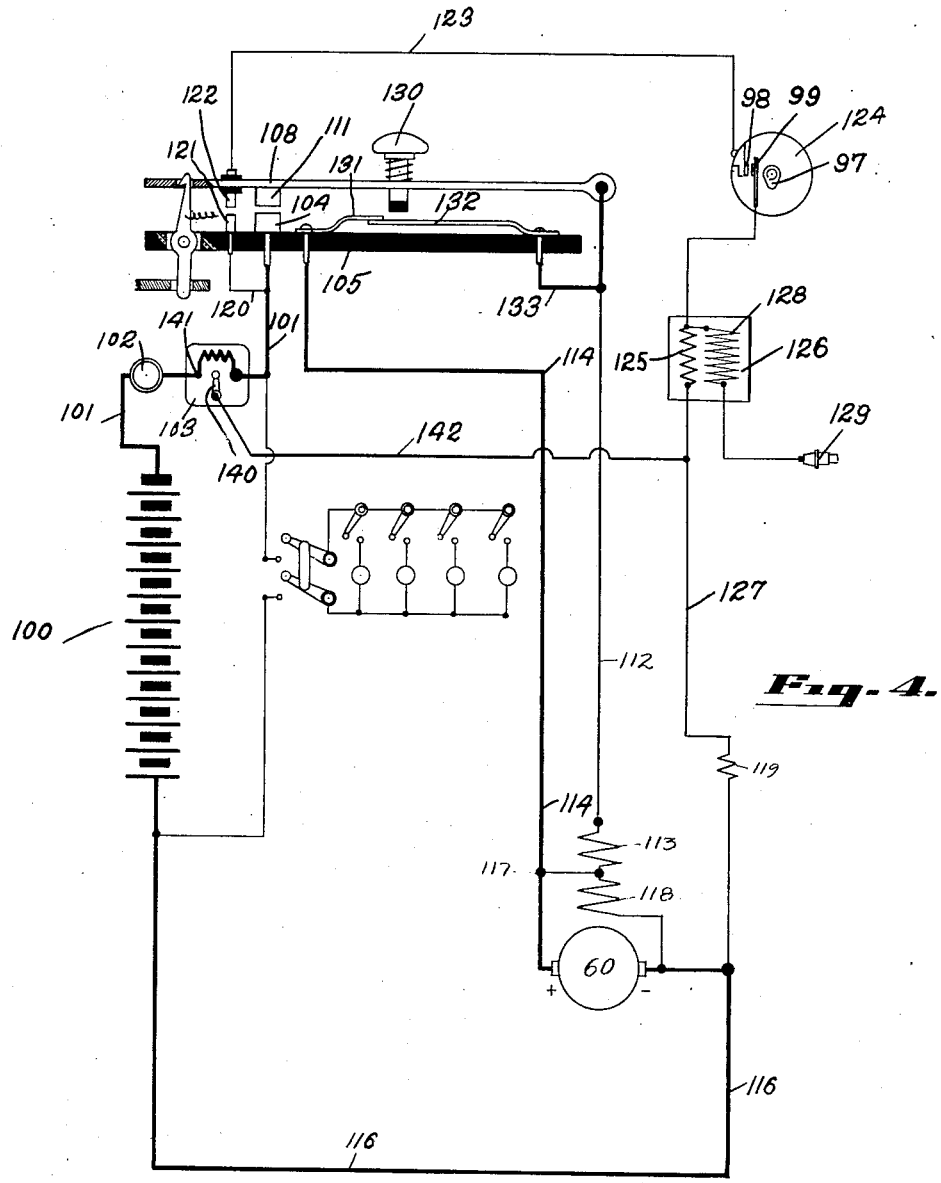

1,501,853

UNITED STATES PATENT OFFICE.

CHARLES F. KETTERING AND WILLIAM A. CHRYST, OF DAYTON, OHIO, ASSIGNORS, BY MESNE ASSIGNMENTS, TO DELCO-LIGHT COMPANY, OF DAYTON, OHIO, A CORPORATION OF DELAWARE.

SYSTEM OF ELECTRICAL GENERATION.

Original application filed October 27, 1915, Serial No. 58,207. Divided and this application filed November 8, 1919. Serial No. 336,589.

*To all whom it may concern:*

Be it known that we, CHARLES F. KETTERING and WILLIAM A. CHRYST, citizens of the United States of America, residing at Dayton, county of Montgomery, and State of Ohio, have invented certain new and useful Improvements in Systems of Electrical Generation, of which the following is a full, clear, and exact description.

The present invention relates to an improvement in what may be termed lighting plants, and more particularly to that type of plant which includes a prime mover or engine, and an electric unit including a dynamo electric machine, a source of power and other devices. This case is a division of an application filed October 27th, 1915, Serial Number 58,207, patented May 15, 1920, No. 1,341,327.

One of the objects of the present invention is to provide a plant of the above mentioned type, wherein the engine and dynamo electric machine are controlled as to some of their operations by certain conditions of the electric unit and engine.

One manner in which the above object may be carried out is to provide mechanism which, when actuated to a determined point by conditions of the electric unit, will tend to automatically discontinue the operation of the engine, and consequently the dynamo, electric machine, and this stopping or slowing down of the engine may then automatically break the charging or main circuit between the dynamo electric machine and the translating devices, which may include the battery.

That is, an instrument of the motor type, preferably controlled by electrical conditions, may be so combined with the ignition system of the engine that when this instrument is actuated a determined degree, the said ignition system may be cut out, as for instance, by short-circuiting the sparking mechanism of the engine. This, of course, will effect the stopping of the engine and consequently the stopping of the dynamo electric machine.

Now, a control device or governor, preferably included in the system or plant, and which may be controlled by speed conditions of the engine, will be brought into actuation to break the main charging circuit, upon the slowing down or stopping of the engine. This operation will prevent the flow of current from the battery, back through the dynamo electric machine, which would, of course, tend to actuate the dynamo electric machine as a motor.

Further objects of the present invention are to provide a system of the type heretofore set forth, which will be extremely compact and simple in construction, and which may be manufactured at low cost, but which will be extremely durable and efficient in operation.

Further objects and advantages of the present invention will appear hereinafter, reference being had to the accompanying drawings, wherein a preferred form of embodiment of the present invention is clearly set forth.

In the drawings:

Fig. 1 is a sectional view of the engine and dynamo electric machine embodied in the present invention, certain of the parts being shown in elevation for the sake of clearness.

Fig. 2 is a perspective view of the power plant, including the engine and dynamo electric machine shown in Fig. 1.

Fig. 3 is a sectional view of a circuit controller included in the present invention.

Fig. 4 is a diagrammatic view of the electrical devices, circuits and connections embodied in the present invention.

Referring to the drawings, and particularly to Figs. 1 and 2, it will be noted that there is illustrated a power plant, including an engine 20, which may be of any suitable type, but which is shown in the present instance as comprising a single cylinder engine of the four cycle type. This plant also includes a dynamo electric machine 21, hereinafter known as an electric machine, coupled to the engine in any suitable manner, and which is capable of operation, either as a motor or as a generator.

The engine 20 may be said to constitute a prime mover, which is adapted to be started by the operation of the electric machine as a motor, and which then is adapted to operate the electric machine as a generator to furnish current for any suitable purpose.

The engine in the present instance comprises a base 22, which may be separate from or formed with the crank case 23 of the engine, and which supports not only the engine, but also the electric machine 21.

The crank case 23 has the crank shaft 24 mounted therein. This shaft in turn carries the piston 25 and its connecting rod 26, in the usual manner. One end of this shaft, designated by the numeral 27, extends through the bearing 28, mounted in the end wall 29 of the crank case.

By referring to Fig. 1, it will be noted that the crank case 23 is formed of a single casting, having inner and outer walls 30 and 31 respectively. These walls are spaced apart by means of ribs 32, in such a manner as to form an air chamber 33 therebetween.

This air chamber extends completely around the crank case, but is enclosed at one end of the crank case by means of the end wall 29, which also acts as a closure for the crank case chamber 34. The air chamber, however, on the opposite end of the crank case, is left open so as to communicate with the fan structure 35, included in the flywheel of the engine. This end of the crank case chamber 34 is closed by means of a removable head 36, which is secured to the inner wall 30 of the crank case. The air chamber 33 is also open as at the point 37, so as to communicate with the air chamber 38, formed by surrounding the engine cylinder 39 with the draft tube 40. The upper end of the tube 40 is left open to permit the air chamber to communicate with the outside atmosphere, although a guard 41, which is preferably a screen, is secured to the upper end of the tube 40.

In the present invention, the flywheel 44 of the engine includes a fan structure 35, which is adapted to create a circulation of air about the cylinder and crank case of the engine, by drawing air through the screen 41, and down through the air chambers 37 and 33, and finally expelling or blowing out this air in such a direction as to cause it to again contact with the exterior of the draft tube and crank case, as is more fully set forth and claimed in the above mentioned patent.

Referring to Fig. 1, the electric machine 21 comprises a field frame 57, carrying the pole shoe 58 and the field winding 59, (only one of the pole shoes and field coils being shown). This field frame is securely bolted to the crank case 23, to hold the same in proper position. The moving part or armature 60 of the electric machine, is mounted upon the extended end 27 of the crank shaft 24.

This armature will of course operate at the same speed as the crank shaft of the engine, and, in the absence of special provision for cooling, the effect of this high speed operation of the armature, will tend to cause the heating of certain of the parts of the electric machine.

These parts, which tend to heat, are maintained relatively cool by means of the fan structure 35. Communication is established between the air chamber 33 and the interior of the electric machine, by providing openings 61 in the end walls 29. The interior of the electric machine also has communication through the openings 62 provided in the front end cover 66. It will therefore be seen that as the fan structure is set in operation, air will be sucked through the openings 62, and into contact with the interior parts of the electric machine.

The air will then be drawn through the openings 61, through the air chamber 33, to the fan structure 35, and then expelled or blown out by this fan structure.

The armature 60 of the electric machine may be said to be floated upon the end of the crank shaft, and due to the balancing effect of this armature, relative to the crank shaft, no bearing is necessary to support the extreme end of the crank shaft.

The armature, as will be described hereinafter, is provided with the usual windings, and includes a commutator 63, which co-operates with suitable brushes 64, each of which is mounted upon a plate 65.

The inlet and exhaust valves of the engine are located in the head of the cylinder, and are actuated by rocker arms 71 and 72 respectively, see Fig. 2. These rocker arms in turn are operated by reciprocating valve rods 73, one of which is actuated by means of a cam 74, while the other is moved by means of the cam 75, shown in dotted lines in Fig. 1.

These cams are mounted upon a shaft 76, which carries a pinion 77, said pinion meshing with a gear wheel 78, mounted upon and driven directly by the crank shaft 24. It will be understood that these cams are so arranged that they will actuate their respective valves at the proper intervals to open and close the same.

The above mentioned shaft 76 is suitably mounted in the crank case and has one end projecting through said case. This extended end of the shaft 76 carries a cam 97, which tends, as said shaft is rotated, to make and break the ignition circuit by closing and opening the contacts 98 and 99, see Figs. 2 and 4.

A mixing valve or carburetor 90 is secured to the cylinder of the engine, in such a manner as to properly supply fuel thereto, and may be provided with the usual adjustments for controlling the proportion of air and gas, or whatever fluids may constitute the fuel.

By referring to Fig. 2, it will be seen that a fuel supply pipe 91 connects the carburetor 90 with the fuel tank 92.

This carburetor 90 includes the usual butterfly or throttle valve 94, which is connected with the rod 93. As will appear hereinafter, this valve 94 is automatically controlled as to its position by the speed of the engine, and in this connection, forms a safety device which prevents the engine from racing or running above a determined maximum.

By referring to Fig. 4, the electrical devices, connections and circuits, included in one form of the present invention, are clearly set forth diagrammatically.

The electric machine, which has been referred to heretofore, is preferably so wound that when operating as a motor for starting purposes, it comprises a compound wound motor, while when said machine is operating as a generator, the windings are changed so that the machine will operate as a shunt wound generator.

The circuits and connections, together with the controlling devices, will be clearly understood from the following descriptions:

The storage battery 100 may be of any suitable type and may include any suitable number of cells. One side of the battery is connected to a conductor 101, which leads to the instruments 102 and 103 respectively. The instrument 102 may be an ammeter, while the instrument 103 is preferably an ampere hour meter. It will be seen that the ampere hour meter is placed directly in series with the battery, so that all current which passes into or out of the battery, must pass through said meter. This meter will therefore indicate the amount of charge contained in the battery.

The conductor 101 terminates with its connection to the contact 104, which is mounted upon a switch board 105. This board 105 is preferably mounted upon the electric machine by means of brackets 107, see Figs. 1 and 2, and supports certain of the instruments included in the present system.

A contact 111 carried by the controller 108, is adapted to co-operate with the contact 104, when the controller is manually moved from its normal open position to its closed or contact making position. The controller is electrically connected to conductor 133, which leads to the positive brush of the electric machine.

The electric machine which is shown diagrammatically with its armature at 60, has the positive brush connected to the conductor 114 which in turn is connected to the conductor 133 through the switch contact blades 131 and 132. The negative brush of the electric machine is connected to the conductor 116 leading directly to the negative side of the battery. The electric machine is provided with a shunt field winding at 118 and also with a series field winding 113, the latter having one end connected to the conductor 114 at 117 and the other end connected through conductor 112 with the conductor 133, as shown in the drawings.

When current is passing from the battery through the series field winding to operate the electric machine as a motor for cranking purposes, the series field winding is so connected and brought into circuit that its magnetic effect will be added to that of the shunt field winding, thereby tending to increase the torque effect of the electric machine as a motor, whereby the cranking of the engine will be facilitated. That is, the above described construction and arrangements tend to give the electric machine the characteristics of a compound wound motor, during this cranking operation.

Supposing the engine 20 is at rest, and it is desired to operate the electric machine as a motor for starting purposes:

The operator will move the controller 108 to closed position, thereby bringing the contacts 104 and 111 together and thus closing the following circuit:

From the positive side of the battery 100, current will flow through the conductor 101, through the instruments 102 and 103, across the contacts 104 and 111, to the conductor 112, via the controller 108, directly through the series field winding 113, across the armature 60, back to the battery 100, via conductor 116. This circuit may be called the starting or cranking circuit.

There will also be a flow of current through the shunt field windings 118, and as before stated, the magnetic effect of the shunt winding will be reinforced by that of the series winding. The result of this will be to increase the torque effect of the electric machine, as a motor, whereby to facilitate and insure the cranking of the engine.

Concomitantly with the closing of the motor circuit, as above described, the following ignition circuit will be closed, thereby furnishing ignition for the engine.

From the line conductor 101, through branch wire 120, to stationary contact 121, mounted on the switch board 105. This contact 121 will be engaged by the contact 122, carried by, but insulated from controller 108. Thence through wire 123, to the timer 124, across the contacts 98 and 99 of said timer, provided of course that the cam 97 is in position to close said contacts, to the primary winding 125 of the induction coil 126, back to the opposite side of the battery, via conductors 127 and 116. Conductor 127 includes resistance 119. The secondary winding 128 of the coil 126 is connected in the usual manner with the spark plug 129.

During the starting operation heretofore described, the controller is maintained by the operator in position to close the contacts 104 and 111, to make the cranking circuit, and to close the contacts 121 and 122, to make the ignition circuit. However, during this operation, the push button or switch member 130 is forced into such position by the attendant that the contact between the switch contact blades 131 and 132 is broken, to thereby dis-establish a circuit which normally tends to short circuit the series field winding, during the generating function of the machine. This switch member 130 is therefore maintained in position to break this circuit throughout the operation of the machine as a motor, to thereby render said series windings effective.

Now, as soon as the engine becomes self-actuating and its speed reaches a determined point, the necessity of the operator maintaining the controller 108 in contact closing position is eliminated, inasmuch as this controller will be automatically maintained in this position by a suitable latch mechanism described hereinafter. The operator will also release the switch member 130 as soon as the engine becomes self-actuating, thereby closing the contact blades 131 and 132.

Now, throughout the operation of the engine, the electric machine will be driven thereby and as soon as the speed of the engine has reached or passes a determined point, the electric machine will function as a generator, and tend to charge the storage battery through the following circuit:

From the positive brush of the electric machine the current will flow through the wire 114 to the contact blade 131, and across contact blade 132 to the controller 108, via wire 133. From the controller 108, the current will pass through the contacts 111 and 104, then through conductor 101, passing through the ampere hour meter 103 and the ammeter 102 to the positive side of the battery 100. The negative side of the battery is connected by means of conductor 116 to conductor 115, which leads directly to the negative commutator brush of the armature. This circuit which is shown in heavy lines may be called the battery charging circuit.

The conductor 114, contacts 131 and 132, and the conductor 133 are preferably of extremely low resistance, in actual structure being made of comparatively large diameter stock, and being reduced in length as much as possible. That is, the resistance of this portion of the main charging circuit, is much less than the resistance of the series field circuit, which consists of the series field coil 113 and the conductor 112.

It will therefore be seen that while the contact blades 131 and 132 are closed, the series field will be short-circuited, and such a small amount of current will flow therethrough that the regulating effect of the series field, relative to the shunt field, will be negligible.

It has been described heretofore that the shunt field coil and the series field coil are so wound that during the motor or cranking operation of the electric machine, the effect of the series field will be added to the effect of the shunt field.

It will therefore be understood that during the operation of the electric machine as a generator, the effect of these two sets of fields, that is, the series field winding and the shunt field winding, would normally be opposed, and would therefore affect the output of the electric machine materially. However, by providing the short circuiting arrangement described heretofore, the regulating effect of the series winding is substantially eliminated during the generating operation.

The construction of storage batteries and other types of accumulators at the present time, makes it advisable to provide means for preventing the over-charging of the storage battery, inasmuch as this over-charging tends to affect the efficiency and life of the battery in a number of objectionable ways.

As has already been explained, the ampere hour meter 103 is so interposed in the main circuit, that all current passing into or out of the battery, must pass through this meter. This meter may be of any approved type, but is provided with an indicating hand or element 140, which tends to oscillate over a suitable dial, to indicate the amount of charge contained in the battery.

Now, upon the battery becoming fully charged, this indicating element will have moved to such a position as to engage or contact with the terminal 141. The indicating arm 140 is electrically connected to the main line 127 of the ignition system, by the conductor 142, and inasmuch as the conductor 142 will be of much less resistance than the induction coil, timing device and conductors leading thereto, of said ignition system, these parts, that is, the induction coil and timing device, will be short-circuited. That is, current from the storage battery will flow through the conductor 101, ammeter 102, ampere hour meter 103, to the terminal 141, thence through the indicating element 140, to the conductor 142, thence through the main line 127 of the ignition system, and back to the battery, via conductor 116.

By short-circuiting the induction coil and the timing device, the engine will be deprived of ignition, and will of course consequently stop.

From the above, it will be seen that as soon as the engine stops, the electric machine, which is connected therewith, will also cease to operate.

From the above description, it will be clear that over-charging of the battery will be automatically prevented and that the means for preventing this over-charging is controlled directly by the conditions of the battery itself. However, it will further appear that if the engine is brought to a stop and consequently the electric machine is stopped, there would be a tendency for the current to flow back from the battery, through the electric machine, and thereby operate said machine as a motor, which would of course effect the starting up of the engine.

In the present invention, this back flow of current from the battery is prevented by the automatic breaking of the main charging circuit, as soon as the speed of the engine is reduced below a determined point.

The means for breaking the main charging circuit between the electric machine and the battery, is controlled by a mechanical governor, which is actuated in accordance with the speed of the engine. This mechanical governor includes a plurality of weighted levers 150, pivotally mounted on the fan blades 49 of the flywheel. The weighted ends 151 of these levers are held in normal position by the spring 152. The opposite end of said levers engage in a groove 153, formed in the collar 154, which is slidably mounted on the hub 46 of the engine flywheel.

This collar is provided with a second groove 155, in which one end of the bell crank lever 156 fits, the opposite end of said lever being secured to the rod 157. This bell crank lever is pivotally mounted on any suitable plate, such as is designated by the numeral 159.

The rod 157 extends upwardly and is connected at its upper end to the arms 160 and 161, which have a fixed connection with the bar 162 and the throttle valve rod 93 respectively.

The bar 162 is rotatably mounted in the bearings 164 and 165. Adjacent to one end of said bar, an arm 166 is connected thereto, and carries a plate 167, which is adapted to engage with a hook or latch member 169. This hook or latch member 169, which is clearly shown in Figs. 1, 2, 3 and 4, passes through an opening formed in the controller 108, and has a hooked end, which is adapted to engage with said controller, under certain conditions, as will appear hereinafter.

The arm 161, which is clearly shown in Fig. 2, as being connected to the rod 157 at one end, while the opposite end thereof is fixed to the throttle valve stem, as mentioned above, is intended to maintain the throttle valve in proper position for the operation of the engine, except at such times as the engine is inadvertently relieved of its load, and tends to race or exceed a determined maximum speed.

From the foregoing description of the construction of the mechanical governor and its associated mechanisms, it will be apparent that as the engine becomes self-actuating and the speed thereof tends to increase, the weighted levers 150 will be thrown outwardly and thereby cause the collar 154 to slide on the hub of the flywheel. This movement of the collar 154 will tend to rock the bell crank lever 156, which movement will pull down the rod 157. As the rod 157 moves downward, the arm 160 will be so actuated as to turn the bar 162 and thereby swing the plate 167 downwardly, and consequently raise the hooked end of the latch member 169 into position to engage with the circuit controller 108.

As has already been stated, the circuit controller 108 is initially operated manually, against the tension of the spring 170, to close the main motor circuit and the ignition circuit, by bringing the contacts 104 and 111 together, and also bringing the contacts 121 and 122 together.

It has further been described that the push button 130 is actuated during this initial operation to separate the contacts 131 and 132, in order to secure the proper characteristics of the electric machine, when operating as a motor.

This controller 108 should be manually maintained in its contact making position throughout the operation of the electric machine as a motor for starting purposes, and until such a time as the engine has reached sufficient speed to cause the governor to operate the latch mechanism, in order to securely latch the controller in its closed position.

In engines of the type heretofore described and illustrated in the drawings, it is some times difficult for the attendant or operator to ascertain when the engine has become self-actuating. That is, if the switch board, for instance, is mounted at a distance from the engine, or if the noise which normally accompanies the operation of an engine of this sort, is so reduced or muffled that it is difficult to distinguish, the operator would possibly continue to hold the controller in contact closing position, even after the engine had become self-actuating. Or, what would be more probable, would be that the operator would tend to release the controller, previous to the engine becoming self-operating.

Any premature release of this controller by the operator, will separate the contacts 121 and 122, and contacts 104 and 111 respectively. This premature separation of the contacts will tend to cause arcing therebetween, which might prove injurious to the respective contacts, and therefore injurious to the entire system.

The present invention therefore embodies means which will definitely indicate to the operator when the engine becomes self-actuating, and therefore when it is permissible for him to release the pressure on the controller 108.

This means comprises a plate 175, secured to the controller, which will bear any suitable inscription or words, such as "Release" or "Running", thereby signifying that it is all right to "release" the controller, or that the engine is "running".

A projection, or what may be better termed an apron 176, is carried by the latch member 169, in such a manner that when the system is at rest, or when the electric machine is cranking the engine, the plate 175 will be covered by the apron 176.

As soon as the engine has become self-actuating, however, the latch member will be actuated, as described heretofore, thereby exposing the plate 175, which will bring the inscription on said plate into view, signifying that the operator may release the manual pressure on the controller 108 and switch member 130.

From the aforegoing description, it will be understood that as soon as the engine slows down, or is brought to a stop, the weighted levers 150 will assume their normal position, under the influence of the spring 152, and this will tend to return the various parts which are connected with said mechanical governor, to their normal position, such as is shown in Fig. 1. As soon as these parts are returned to normal position, the latch member 169 will of course tend to release the controller 108 and the spring 170 will then force said controller into its normal open position, thereby breaking the main charging circuit and preventing a back flow of current from the battery, through the electric machine.

As has already been explained, when the rod 157 is pulled downwardly, the arm 161 will also be pulled downwardly, and this will tend to actuate the throttle valve in such a manner as to permit the correct amount of fuel to be delivered to the engine.

Now, in case the load of the electric machine is removed from the engine, such as by the breaking of the main circuit between the electric machine and the battery, the engine will be prevented from racing or increasing its speed to an excessive point, by the further operation of the throttle valve, due to the extended movement of the mechanical governor in such a manner that the throttle valve will entirely close the fuel passage between the fuel tank 92 and the cylinder of the engine, and in this way will tend to prevent said engine from attaining an excessive speed.

While the form of mechanism herein shown and described, constitutes a preferred embodiment of one form of the invention, it is to be understood that other forms might be adopted and various changes and alterations made in the shape, size, and proportion of the elements therein without departing from the spirit and scope of the invention.

What is claimed is as follows:—

1. In an electric generating system, an engine; a dynamo-electric machine connected to said engine; a storage battery; a circuit controller for controlling the electrical connections of the dynamo-electric machine and the battery, said controller comprising a pair of switches having common operating means for moving the switches to one position and a governor device controlled by the engine speed for maintaining one of said switches in said position.

2. In an electric generating system, an engine; a dynamo-electric machine connected to said engine; a storage battery; a circuit controller for controlling the electrical connections of the dynamo-electric machine and the battery, said controller comprising a pair of switches having common operating means for moving the switches to one position and a governor device controlled by the engine speed for maintaining one of said switches in said position while permitting the release of the second switch from said position.

3. In an electric generating system, an engine; a dynamo-electric machine connected to said engine, said dynamo-electric machine being capable of operating as a motor or a generator and having series and shunt windings; a storage battery; a circuit controller for controlling the electrical connections of the dynamo-electric machine and the battery, said controller comprising a pair of switches having common operating means for moving the switches to one position for operation as a motor, and a governor device controlled by the engine speed for maintaining one of said switches in position while permitting the movement of the second switch from said position to short circuit the series winding for operation as a generator.

4. In an electric generating system, an engine; a dynamo-electric machine connected to said engine, said dynamo-electric machine being capable of operating as a motor or a generator and having series and shunt windings; a storage battery; and a circuit controller for controlling the electrical connections of the dynamo-electric machine and the battery, said controller comprising means for connecting the dynamo-electric machine with both windings for operation as a motor, said controller comprising a second means responsive to the engine speed for maintaining the shunt connection for operation as a generator and responsive to either the engine speed or the condition of charge of the battery for disconnecting the dynamo-electric machine from the battery.

5. In an electric generating system, an engine; a dynamo-electric machine connected to said engine, said dynamo-electric machine being capable of operating as a motor or a generator and having series and shunt windings; a storage battery; and a circuit controller for controlling the electrical connections of the dynamo-electric machine and the battery, said controller comprising means for connecting the dynamo-electric machine with both windings for operation as a motor, said controller comprising a second means responsive to the engine speed for maintaining the shunt connection for operation as a generator at substantially the same voltage as when operating as a motor and responsive to either the engine speed or the condition of charge of the battery for disconnecting the dynamo-electric machine from the battery.

6. In an electrical system, the combination with an engine; a dynamo electric machine capable of operation as a motor for starting the engine, and as a generator; a current source and circuit connections including a circuit controller having a manually operable member, to close certain of the circuit connections between the current source and the electric machine, whereby to effect the operation of the electric machine as a motor for starting purposes; said controller having provisions to automatically maintain certain of said connections closed, while permitting the release of the manually operable member to effect the control of other of said connections when the electric machine is operating as a generator.

7. In an electric generating system, an engine; a dynamo-electric machine connected to said engine; a storage battery; a circuit controller for controlling the electrical connections of the dynamo-electric machine and the battery, said controller comprising a plurality of switches having common operating means for moving the switches to one position and engine controlled means for maintaining one of said switches in said position.

8. In an electric generating system, an engine; a dynamo-electric machine connected to said engine; a storage battery; a circuit controller for controlling the electrical connections of the dynamo-electric machine and the battery, said controller comprising a plurality of switches having common operating means for moving the switches to one position and means for maintaining one of said switches in said position upon the attainment of predetermined operating conditions in the system.

9. In an electric generating system, the combination with an engine; of an ignition circuit therefor; a dynamo-electric machine connected to said engine; a storage battery; a charging circuit connecting said dynamo-electric machine and said battery; operating means normally in one position and movable to another position to close said circuits; and means for maintaining said circuits closed after the return of said operating means from said circuit closing position to said normal position.

10. In an electric generating system, the combination with an engine; of an ignition circuit therefor; a dynamo-electric machine connected to said engine; a storage battery; a charging circuit connecting said dynamo-electric machine and said battery; operating means normally in one position and movable to another position to close said circuits; and means for maintaining said circuits closed after the return of said operating means from said circuit-closing position to said normal position, said maintaining means being responsive to a change in engine speed for opening said circuits and stopping the engine.

11. In an electric generating system, the combination with an engine; of an ignition circuit therefor; a dynamo-electric machine connected to said engine; a storage battery; a charging circuit connecting said dynamo-electric machine and said battery; a switch in said ignition circuit; and mechanical switch controlling means connected with said switch, said switch controlling means being driven from the engine crank shaft and operable automatically to open said switch.

12. In an electric generating system, the combination with an engine; of an ignition circuit therefor; a dynamo-electric machine connected to said engine; a storage battery; a charging circuit connecting said dynamo-electric machine and said battery; a switch in said ignition circuit; mechanical switch controlling means connecting with said switch and normally holding the same closed, said switch controlling means being driven from the engine crank shaft and operable automatically to open said switch.

In testimony whereof they affix their signatures.

CHARLES F. KETTERING.
WILLIAM A. CHRYST.

Witnesses:
MILDRED PEARE,
HAZEL SOLLENBERGER.